US011738608B2

(12) United States Patent
Wu et al.

(10) Patent No.: US 11,738,608 B2
(45) Date of Patent: Aug. 29, 2023

(54) MONITORING DEVICE

(71) Applicant: Foxwell Technology Co., Ltd., Guangdong (CN)

(72) Inventors: Liangjun Wu, Guangdong (CN); Zequn Liu, Guangdong (CN); Cunjin Chi, Guangdong (CN); Huosheng Xu, Guangdong (CN)

(73) Assignee: FOXWELL TECHNOLOGY CO., LTD., Guangdong (CN)

( * ) Notice: Subject to any disclaimer, the term of this patent is extended or adjusted under 35 U.S.C. 154(b) by 266 days.

(21) Appl. No.: 17/231,283

(22) Filed: Apr. 15, 2021

(65) Prior Publication Data

US 2022/0305853 A1 Sep. 29, 2022

(30) Foreign Application Priority Data

Mar. 23, 2021 (CN) .......................... 202120586859.0

(51) Int. Cl.
*B60C 23/04* (2006.01)
*G07C 5/00* (2006.01)

(52) U.S. Cl.
CPC ........ *B60C 23/0452* (2013.01); *B60C 23/041* (2013.01); *G07C 5/008* (2013.01)

(58) Field of Classification Search
CPC .............. B60C 23/0452; B60C 23/041; B60C 23/0494; G07C 5/008

USPC ......................................................... 340/447
See application file for complete search history.

(56) References Cited

U.S. PATENT DOCUMENTS

| | | | | |
|---|---|---|---|---|
| 9,821,613 B2* | 11/2017 | Patterson | ............ | B60C 23/0452 |
| 11,167,603 B2* | 11/2021 | Qiu | ........................ | H01Q 23/00 |
| 2006/0077051 A1* | 4/2006 | Chen | ................... | B60C 23/0408 |
| | | | | 340/447 |
| 2010/0164705 A1* | 7/2010 | Blanchard | ........... | B60C 23/0491 |
| | | | | 340/442 |
| 2016/0176247 A1* | 6/2016 | Cheikh | ............... | B60C 23/0444 |
| | | | | 340/447 |
| 2020/0139771 A1* | 5/2020 | Qiu | ........................ | H01Q 23/00 |

* cited by examiner

*Primary Examiner* — Eric Blount
(74) *Attorney, Agent, or Firm* — Whiteford, Taylor & Preston, LLP; Peter J. Davis

(57) ABSTRACT

Disclosed is a monitoring device used for acquiring monitoring data of a tire, which includes a housing, the housing comprises an upper housing and a lower housing, a cavity is formed between the upper housing and the lower housing; a circuit board, the circuit board comprises a first surface which is a side of the circuit board close to the upper housing, and the circuit board is installed in the cavity; a power supply, the power supply is arranged on one side of the circuit board; and an antenna assembly, the antenna assembly includes a first antenna, the first antenna is wound on the circuit board for at least three turns, and the first antenna is used for transmitting a radio frequency signal to output the monitoring data.

6 Claims, 3 Drawing Sheets

MONITORING DEVICE

CROSS-REFERENCE TO RELATED APPLICATION

This application claims priority to Chinese patent application No. 202120586859.0, filed Mar. 23, 2021, the content of which is incorporated herein by reference in its entirety.

TECHNICAL FIELD

The present disclosure relates to the field of monitoring technology, and more particularly, to a monitoring device.

BACKGROUND

A monitoring device is often installed in a tire to monitor a pressure of the vehicle tire, and a monitoring performance of the monitoring device mainly depends on an antenna inside the monitoring device. Therefore, how to design the antenna of the monitoring device and provide a monitoring device with a high monitoring sensitivity has become an urgent problem to be solved.

SUMMARY

The present disclosure aims to solve at least one of the technical problems in the existing technology. Therefore, the present disclosure provides a monitoring device with a better monitoring sensitivity.

A monitoring device according to some embodiments of the present disclosure is used for acquiring monitoring data of a tire, which includes: a housing, the housing includes an upper housing and a lower housing, a cavity is formed between the upper housing and the lower housing; a circuit board, the circuit board includes a first surface which is a side of the circuit board close to the upper housing, and the circuit board is installed in the cavity; a power supply, the power supply is arranged on one side of the circuit board; and an antenna assembly, the antenna assembly comprises a first antenna, the first antenna is wound on the circuit board for at least three turns, and the first antenna is used for transmitting a radio frequency signal to output the monitoring data; the first antenna includes a first connecting part, a second connecting part, a third connecting part and a fourth connecting part, one end of the first connecting part is connected to the first surface, and one end of the second connecting part is connected to the first connecting part, one end of the third connecting part is connected to the other end of the second connecting part, one end of the fourth connecting part is connected to the other end of the third connecting part, and the other end of the fourth connecting part is connected to the first surface.

The monitoring device according to some embodiments of the present disclosure has at least the following beneficial effects: the monitoring device can reduce an influence of the power supply on an antenna transmitting/receiving signal by arranging the power supply and the antenna assembly on two sides of the circuit board respectively, and can enhance a strength and a stability of a radio frequency transmitting signal by winding the first antenna in the antenna assembly on the circuit board for at least three turns, thus improving a monitoring sensitivity of the monitoring device.

According to some embodiments of the present disclosure, the antenna assembly further includes: a second antenna, the second antenna is installed on the first surface, and the second antenna is used for receiving a low frequency signal.

According to some embodiments of the present disclosure, the first connecting part is L-shaped, and the first connecting part includes: a first connecting section, the first connecting section is located on one side of the circuit board in a length direction, and one end of the first connecting section is connected to the first surface; a second connecting section, the second connecting section is located above the first surface, one end of the second connecting section is connected to the first connecting section, and the other end of the second connecting section is connected to the second connecting part.

According to some embodiments of the present disclosure, the second connecting part is U-shaped, and the second connecting part includes: a third connecting section, one end of the third connecting section is connected to the second connecting section; a fourth connecting section, the fourth connecting section is located on the other side of the circuit board in a length direction, the fourth connecting section is close to a side edge of the circuit board, and one end of the fourth connecting section is connected to the other end of the third connecting section; a fifth connecting section, the fifth connecting section is located below a second surface of the circuit board facing the lower housing, one end of the fifth connecting section is connected to the fourth connecting section, and the other end of the fifth connecting section is connected to the third connecting part.

According to some embodiments of the present disclosure, the third connecting part is Z-shaped, and the third connecting part includes: a sixth connecting section, the sixth connecting section is located below the second surface, and one end of the sixth connecting section is connected to the other end of the fifth connecting section; a seventh connecting section, the seventh connecting section is located below the second surface, one end of the seventh connecting section is connected to the other end of the sixth connecting section; an eighth connecting section, the eighth connecting section is located below the second surface, one end of the eighth connecting section is connected to the other end of the seventh connecting section, and the other end of the eighth connecting section is connected to the fourth connecting part.

According to some embodiments of the present disclosure, the fourth connecting part is U-shaped, and the fourth connecting part includes: a ninth connecting section, the ninth connecting section is located on one side of the circuit board in the length direction, the ninth connecting section is close to the side edge of the circuit board, and one end of the ninth connecting section is connected to the other end of the eighth connecting section; a bending section, the bending section is located above the first surface, and one end of the bending section is connected to the other end of the ninth connecting section; a tenth connecting section, the tenth connecting section is located on the other side of the circuit board in the length direction, one end of the tenth connecting section is connected to the first surface, and the other end of the tenth connecting section is connected to the other end of the bending section.

According to some embodiments of the present disclosure, the bending section includes: a first sub-bending section, one end of the first sub-bending section is connected to the other end of the ninth connecting section; a second sub-bending section, one end of the second sub-bending section is connected to the other end of the first sub-bending section; a third sub-bending section, one end of the third sub-bending section is connected to the other end of the second sub-bending section, the other end of the third sub-bending section is connected to the other end of the tenth connecting section.

According to some embodiments of the present disclosure, the first antenna has a length of 10.08 cm to 10.18 cm.

According to some embodiments of the present disclosure, a main controller is arranged on the circuit board, and a distance between the main controller and the power supply is 4.5 mm to 5 mm.

According to some embodiments of the present disclosure, the lower housing is provided with at least one protrusion, and the protrusion is used for positioning the circuit board.

The additional aspects and advantages of the present disclosure will be partially provided in the following description, and will partially be apparent in the following description, or learned by practice of the present disclosure.

BRIEF DESCRIPTION OF THE DRAWINGS

The present disclosure is further described hereinafter with reference to the accompanying drawings and the embodiments, in which.

DETAILED DESCRIPTION

Figure 1:
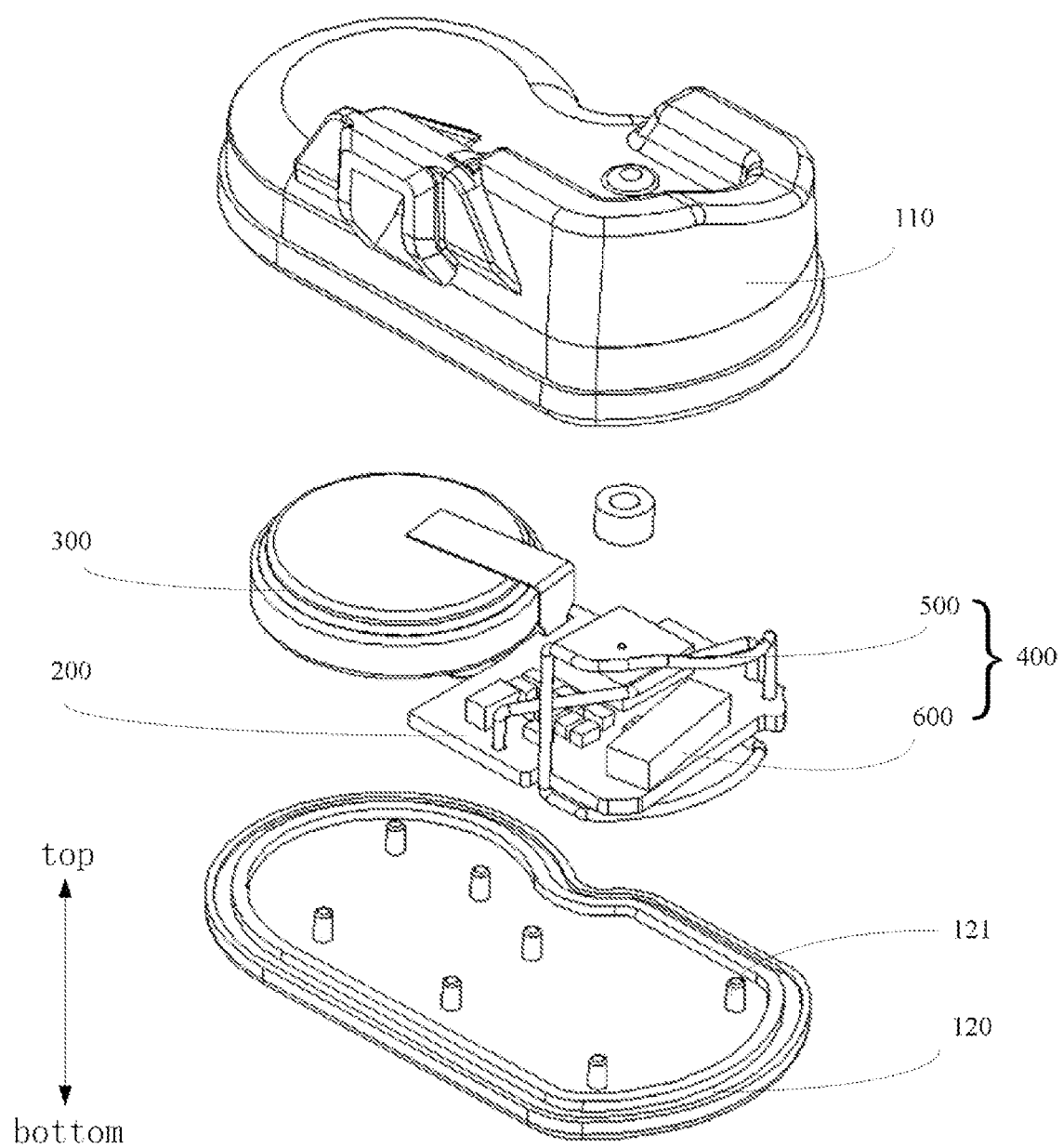
FIG. 1 is a schematic structure diagram of a monitoring device according to an embodiment of the present disclosure.

The embodiments of the present disclosure are described in detail hereinafter. Examples of the embodiments are shown in the accompanying drawings. The same or similar reference numerals throughout the accompanying drawings denote the same or similar elements or elements having the same or similar functions. The embodiments described hereinafter with reference to the accompanying drawings are exemplary and are only used to explain the present disclosure, but shall not be understood as limiting the present disclosure.

In the description of the present disclosure, it shall be understood that the orientation or position relationship indicated by the terms up, down, front, rear, left, right, and the like is based on the orientation or position relationship shown in the accompanying drawings, it is only for the convenience of description of the present disclosure and simplification of the description, and it is not to indicate or imply that the indicated device or element must have a specific orientation, and be constructed and operated in a specific orientation. Therefore, the terms shall not be understood as limiting the present disclosure.

In the description of the present disclosure, the meaning of several refers to be more than one, and the meaning of multiple refers to be more than two. The meanings of greater than, less than, more than, and the like are understood as not including this number, while the meanings of above, below, within, and the like are understood as including this number. If the terms first and second are described, the descriptions are used for the purpose of distinguishing the technical features only, and cannot be understood as indicating or implying relative importance, implicitly indicating the number of technical features indicated thereby, or implicitly indicating the order of technical features indicated thereby.

In the description of the present disclosure, the terms arrangement, installation, connection and the like shall be understood in broad sense unless otherwise specified and defined. The specific meaning of the above terms in the present disclosure may be reasonably determined according to specific contents of the technical solutions by those skilled in the art.

In the description of the present disclosure, the descriptions of the reference terms "one embodiment", "some embodiments", "schematic embodiments", "examples", "specific examples", or "some examples" refer to that the specific features, structures, materials, or characteristics described in combination with the embodiment or example are included in at least one embodiment or example of the present disclosure. In the specification, the schematic expressions of the above terms do not necessarily refer to the same embodiment or example. Furthermore, the specific features, structures, materials, or characteristics described may be combined in any one or more embodiments or examples in a suitable manner.

Figure 2:
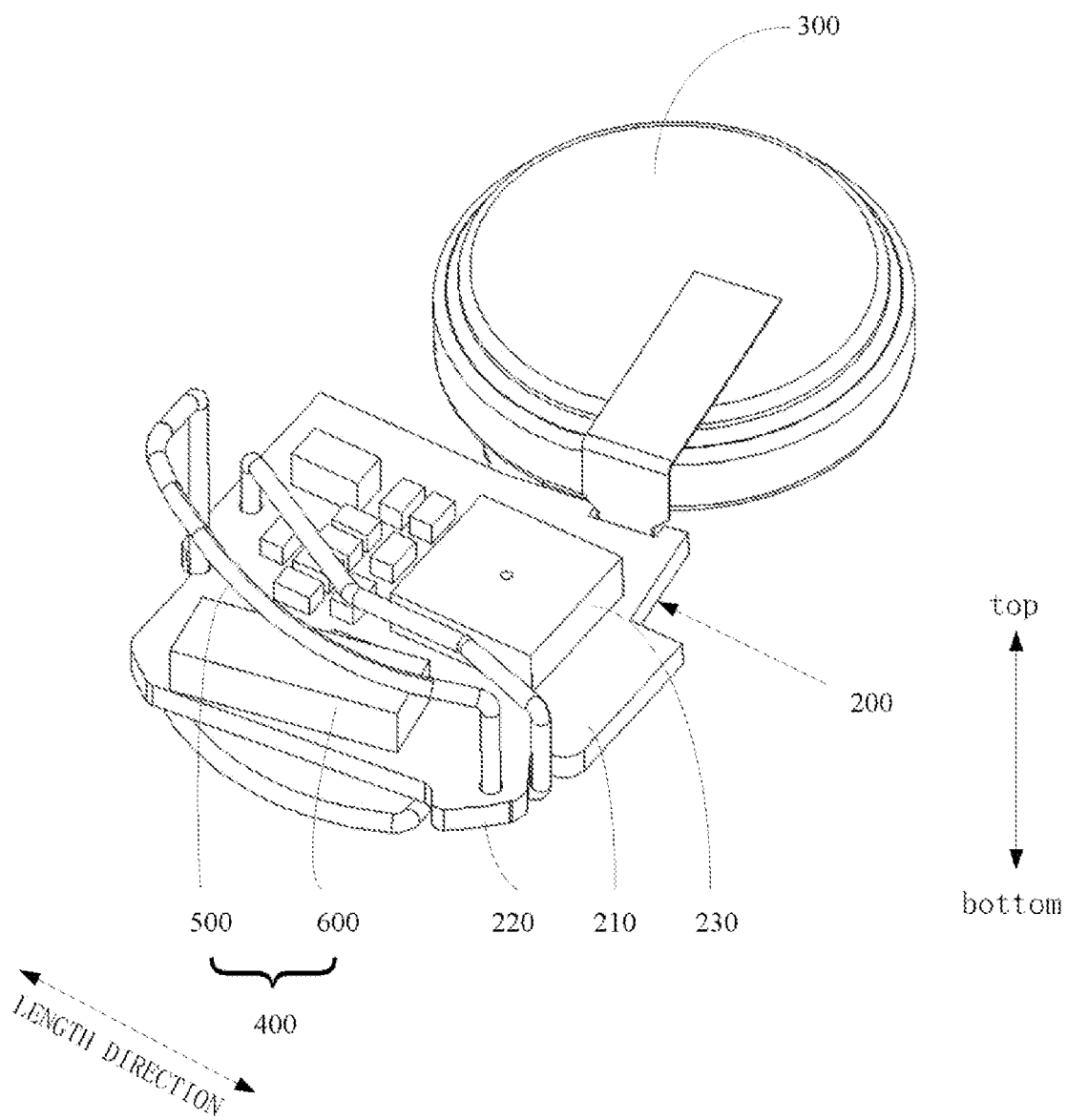
FIG. 2 is a schematic structure diagram of a monitoring device according to an embodiment of the present disclosure.

Referring to FIG. 1 and FIG. 2, a monitoring device according to the embodiment of the present disclosure is used for acquiring monitoring data of a tire, and the monitoring device includes a housing, a circuit board 200, a power supply 300, and an antenna assembly 400. The housing includes an upper housing 110 and a lower housing 120. A cavity is formed between the upper housing 110 and the lower housing 120. The circuit board 200 includes a first surface 210 which is a side of the circuit board 200 close to the upper housing 120, and the circuit board 200 is installed in the cavity; the power supply 300 is arranged on one side of the circuit board 200; and the antenna assembly 400 comprises a first antenna 500, the first antenna 500 is wound on the circuit board 200 for at least three turns, and the first antenna 500 is used for transmitting a radio frequency signal to output monitoring data of the monitoring device. The first antenna 500 includes a first connecting part 510, a second connecting part 520, a third connecting part 530 and a fourth connecting part 540, one end of the first connecting part 510 is connected to the first surface 210, and one end of the second connecting part 520 is connected to the first connecting part 510, one end of the third connecting part 530 is connected to the other end of the second connecting part 520, one end of the fourth connecting part 540 is connected to the other end of the third connecting part 530, and the other end of the fourth connecting part 540 is connected to the first surface 210. The monitoring device includes the upper housing 110, the lower housing 120, the circuit board 200, the power supply 300, and the antenna assembly 400. The circuit board 200 is installed in the cavity formed by the upper housing 110 and the lower housing 120. The power supply 300 is arranged on one side of the circuit board 200, and the antenna assembly 400 is arranged on the other side of the circuit board 200. An influence of the power supply 300 on an antenna transmitting/receiving signal can be reduced by arranging the power supply 300 and the antenna assembly 400 on two sides of the circuit board 200 respectively. The antenna assembly 400 includes the first antenna 500, the first antenna 500 is wound on the other side of the circuit board 200 for at least three turns. The first antenna 500 and electronic components on the circuit board 200 may form a radio frequency transmitting module, and the first antenna 500 is used for transmitting a radio frequency signal. It should be noted that the first antenna 500 may be wound on and connected with the circuit board 200 in an S-shaped winding manner, which is beneficial for miniaturization design of the first antenna 500, and reduces a space occupied by the first antenna 500. Meanwhile, the first antenna 500 is wound on and connected with the circuit board 200, which can enhance a strength of a radio frequency signal in all directions, and reduce a difference in a signal strength in all directions, thereby enhancing a strength and a stability of a radio frequency transmitting signal, and improving the monitoring sensitivity of the monitoring device.

In some embodiments, the power supply 300 may be a cylinder and a square, and may also be other shapes, so that the power supply is not limited to the above shapes.

Referring to FIG. 1 and FIG. 2, in some embodiments, the antenna assembly 400 further includes a second antenna 600, the second antenna 600 is installed on the first surface 210, and the second antenna 600 is used for receiving a low frequency signal. The antenna assembly 400 includes the second antenna 600, the second antenna 600 is installed on the first surface 210 of the circuit board 200, and the second antenna 600 and the electronic components on the circuit board 200 form a low frequency module, so that an external low frequency signal may be conveniently received, and a sensitivity of the monitoring device is improved.

It should be noted that the monitoring device is usually in a dormant state during operation. When receiving the external low frequency signal, a data collection module in the monitoring device may collect information such as a pressure, a temperature, an acceleration, and the like. A main controller may judge a motion state of a vehicle through the information, and the monitoring device transmits a signal according to a corresponding motion state to output a monitoring signal or continues to keep the dormant state, so that power consumption of the monitoring device can be reduced, and a service life of the monitoring device can be delayed. When the tire is in abnormal conditions such as air leakage, low air pressure, and the like, the monitoring device can transmit the radio frequency signal through the first antenna 500 to output corresponding data to the vehicle, thereby playing a role of early warning.

In some embodiments, the first antenna 500 and the second antenna 600 have a strip structure with a circular cross-section or a strip structure with a rectangular cross-section, and may also be other forms, so that the first antenna and the second antenna are not limited to the above strip structures.

Referring to FIG. 1, in some embodiments, the lower housing 120 is provided with at least one protrusion 121, and the protrusion 121 is used for positioning the circuit board 200. In order to improve an internal stability of the monitoring device, the lower housing 120 is provided with at least one protrusion 121, and these protrusions 121 are distributed on an inner surface of the lower housing 120, so that the protrusions 121 can be connected with the second surface 220 of the circuit board 200 facing the lower housing 120, and the circuit board 200 and the power supply 300 may be installed and fixed on the lower housing 120, thus preventing the circuit board 200 and the power supply 300 from shaking due to rotation of the tire, and ensuring an internal stability of a monitoring device. Moreover, the protrusion 121 is used to position the circuit board 200 and the power supply 300, so that an operation is simple and a cost is low. In some embodiments, the protrusion 121 may be a cylinder, a square, a cone, and the like, and may also be other shapes, so that the protrusion is not limited to the above shapes. It can be understood that, in some other embodiments, the circuit board 200 and the power supply 300 may be positioned in other ways, so that the circuit board and the power supply is not limited to the above positioning ways.

Referring to FIG. 1 and FIG. 2, in some embodiments, the main controller 230 is arranged on the circuit board 200, and a distance between the main controller 230 and the power supply 300 is 4.5 mm to 5 mm. In order to ensure that the electronic components on the circuit board 200 can be operated stably and the monitoring device is miniaturized, the distance between the power supply 300 and the main controller 230 is set to be 4.5 mm to 5 mm. When the distance between the power supply 300 and the main controller 230 is set to be 4.5 mm to 5 mm, the main controller 230 can run stably, and is operated normally without being affected by the power supply 300. Meanwhile, a volume of the monitoring device will not be increased due to an excessively long distance between the power supply 300 and the main controller 230, which is beneficial for miniaturization design of the monitoring device.

In some embodiments, the circuit board 200 further includes a clock module composed of a crystal oscillator and other electronic components, and the clock module may provide reliable timing for the circuit, thereby ensuring monitoring sensitivity and stability of the monitoring device.

In some embodiments, the first antenna 500 has a length of 10.08 cm to 10.18 cm. In order to make the monitoring device support transmission of the radio frequency signal at 433 MHz and 315 MHz at the same time, according to a formula wavelength $\lambda$=light speed C/frequency f, when a frequency of the radio frequency signal is 315 MHz, a wavelength of the radio frequency signal is $\lambda$=3*100000000/315 Hz*1000000=0.952 M, and an optimum length of the first antenna is L1=wavelength $\lambda$*1/4=0.952/4=0.238 M. Similarly, when the frequency of the radio frequency signal is 433 MHz, the optimum length of the first antenna 500 is L2=0.17 M. A length of the first antenna 500 supporting the transmission of the radio frequency signal at 433 MHz and 315 MHz at the same time ranges from 10.08 cm to 10.18 cm by matching and debugging the first antenna 500 with a peripheral circuit. When the length of the first antenna 500 is set in this interval, a frequency point of the radio frequency transmitting module composed of the first antenna 500 and the peripheral circuit may be between 315 MHz and 433 MHz, which means that the two frequencies of 315 MHz and 433 MHz are compatible, so that the strength of the radio frequency signal of the monitoring device in all directions can be enhanced and the transmission stability of the radio frequency can be improved.

Figure 3:
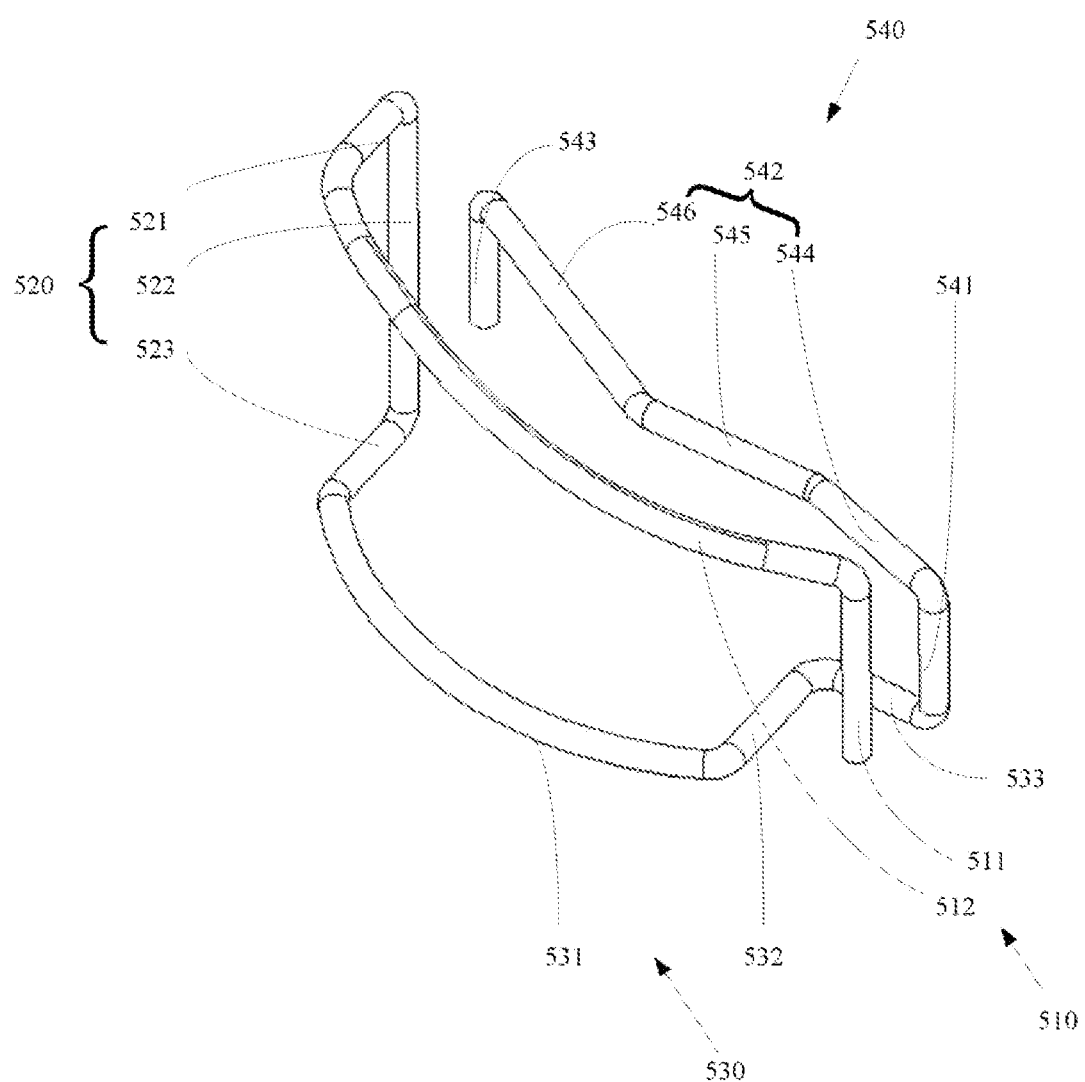
FIG. 3 is a schematic structure diagram of a first antenna in FIG. 1.

Referring to FIG. 2 and FIG. 3, in some embodiments, the first antenna 500 includes a first connecting part 510, a second connecting part 520, a third connecting part 530, and a fourth connecting part 540, one end of the first connecting part 510 is connected to the first surface 210 of the circuit board 200 facing the upper housing 110, one end of the second connecting part 520 is connected to the first connecting part 510, and one end of the third connecting part 530 is connected to the other end of the second connecting part 520, one end of the fourth connecting part 540 is connected to the other end of the third connecting part 530, the other end of the fourth connecting part 540 is connected to the first surface 210. The first antenna 500 surrounds the three sides of the circuit board 200 and is wound on the circuit board for at least three turns, the first antenna 500 includes a first connecting part 510, a second connecting part 520, a third connecting part 530, and a fourth connecting part 540, the first connecting part 510 is L-shaped, and one end of the first connecting part 510 is connected to the first surface 210, the second connecting part 520 is U-shaped, one end of the second connecting part 520 is connected to the first connecting part 510, and the second connecting part 520 is located on the other side of the circuit board 200 in the length direction, it should be noted that a part of the second connecting part 520 is located above the first surface 210, and another part is located below the second surface 220 of the circuit board 200 facing the lower housing 120. The third connecting part 530 is Z-shaped, and the third connecting part 530 is located below the second surface 220 of the circuit board 200 facing the lower housing 120, one end of the third connecting part 530 is connected to an end of the second connecting part 520 located below the second surface 220 of the circuit board 200 facing the lower housing 120, the fourth connecting part 540 is U-shaped, a part of the fourth connecting part 540 is located on one side of the circuit board 200 in the length direction, and this portion is connected with the other end of the third connecting part 530 below the second surface 220, a part of the fourth connecting part 540 is located above the first surface 210, and the other end of the fourth connecting part 540 is connected to the first surface 210. In this way, the strength of the radio frequency signal in all directions can be enhanced, and the difference in the signal strength in all directions can be reduced, thereby enhancing the strength and the stability of the radio frequency transmitting signal, and improving the monitoring sensitivity of the monitoring device.

Referring to FIG. 3, in some embodiments, the first connecting part 510 is L-shaped, and the first connecting part 510 includes a first connecting section 511 and a second connecting section 512. The first connecting section 511 is located on one side of the circuit board 200 in a length direction, and one end of the first connecting section 511 is connected with the first surface 210 of the circuit board 200 facing the upper housing. The second connecting section 512 is located above the first surface 210, one end of the second connecting section 512 is connected with the first connecting section 511, and the other end of the second connecting section 512 is connected with the second connecting part 520. The first connecting part 510 includes the first connecting section 511 and the second connecting section 512. The first connecting section 511 is located on one side of the circuit board 200 in the length direction, and one end of the first connecting section 511 is connected with the first surface 210 of the circuit board 200 facing the upper housing. In some embodiments, in order to ensure the strength of the radio frequency signal, the first connecting section 511 is vertically connected with the first surface 210 of the circuit board 200, and meanwhile. It should be noted that in order to ensure the strength of the radio frequency signal, a plane where the second connecting section 512 is located is parallel to the first surface 210 of the circuit board 200, so that the strength of the radio frequency signal can be enhanced, thereby improving the monitoring sensitivity of the monitoring device.

It should be noted that the second connecting section 512 may be bent to form a certain arc according to actual conditions, or may be bent into several small sections.

Referring to FIG. 3, in some embodiments, the second connecting part 520 is U-shaped, and the second connecting part 520 includes a third connecting section 521, a fourth connecting section 522, and a fifth connecting section 523, one end of the third connecting section 521 is connected to the second connecting section 512; the fourth connecting section 522 is located on the other side of the circuit board 200 in the length direction, the fourth connecting section 522 is close to the side edge of the circuit board 200, and one end of the fourth connecting section 522 is connected to the other end of the third connecting section 521; the fifth connecting section 523 is located below the second surface 220 of the circuit board 200 facing the lower housing 120, one end of the fifth connecting section 523 is connected to the fourth connecting section 522, and the other end of the fifth connecting section 523 is connected to the third connecting part 530. The second connecting part 520 includes a third connecting section 521, a fourth connecting section 522, and a fifth connecting section 523, the third connecting section 521 is located on the other side of the circuit board 200 in the length direction, and the third connecting section 521 is located above the first surface 210, the fourth connecting section 522 is located on one side of the circuit board 200 in the length direction, the fourth connecting section 522 is close to the side edge of the circuit board 200, and one end of the fourth connecting section 522 is connected to the third connecting section 521, in order to improve the strength of the radio frequency signal, the plane formed by the third connecting section 521 and the fourth connecting section 522 is perpendicular to the plane where the circuit board 200 is located. The fifth connecting section 523 is located below the second surface 220, one end of the fifth connecting section 523 is connected to the fourth connecting section 522, and the other end of the fifth connecting section 523 is connected to the third connecting part 530, in order to improve the strength of the radio frequency signal, the plane formed by the fifth connecting section 523 and the fourth connecting section 522 is perpendicular to the plane where the circuit board 200 is located, which can increase the radio frequency signal strength, thereby improving the monitoring sensitivity of the monitoring device.

Referring to FIG. 3, in some embodiments, the third connecting part 530 is Z-shaped, the third connecting part 530 includes a sixth connecting section 531, a seventh connecting section 532, and an eighth connecting section 533, the sixth connecting section 531 is located below the second surface 220, one end of the sixth connecting section 531 is connected to the other end of the fifth connecting section 523; the seventh connecting section 532 is located below the second surface 220, one end of the seventh connecting section 532 is connected to the other end of the sixth connecting section 531, the eighth connecting section 533 is located below the second surface 220, one end of the eighth connecting section 533 is connected to the other end of the seventh connecting section 532, and the other end of the eighth connecting section 533 is connected to the fourth connecting part 540. The third connecting part 530 includes a sixth connecting section 531, a seventh connecting section 532, and an eighth connecting section 533, the sixth connecting section 531 is located below the second surface, and the sixth connecting section 531 is connected to the fifth connecting section 523, in order to improve the strength of the radio frequency signal, the plane where the sixth connecting section 531 is located is parallel to the second surface 220, and the sixth connecting section 531 can be bent to form an arch-shaped. In order to prevent the first antenna 500 from being damaged due to an excessively large bending angle, the sixth connecting section 531 may be bent with an amplitude of 1.5°, so that the sixth connecting section 531 forms an arcuate shape; the seventh connecting section 532 is located below the second surface 220, one end of the seventh connecting section 532 is connected to the other end of the sixth connecting section 531, the eighth connecting section 533 is located below the second surface 220, one end of the eighth connecting section 533 is connected to the seventh connecting section 532, and the other end of the eighth connecting section 533 is connected to the fourth connecting part 540, the eighth connecting section 533 can be vertically connected with the seventh connecting section 532, in this way, the strength of the radio frequency signal under the circuit board 200 can be increased, and the difference in signal strength in various directions can be reduced, thereby enhancing the strength and stability of the radio frequency transmission signal, thereby improving the monitoring sensitivity of the monitoring device.

Referring to FIG. 3, in some embodiments, the fourth connecting part 540 is U-shaped, the fourth connecting part 540 includes a ninth connecting section 541, a bending section 542, and a tenth connecting section 543, the ninth connecting section 541 is located on one side of the circuit board 200 in the length direction, the ninth connecting section 541 is close to the side edge of the circuit board 200, and one end of the ninth connecting section 541 is connected to the other end of the eighth connecting section 533; the bending section 542 is located above the first surface 220, and one end of the bending section 542 is connected to the other end of the ninth connecting section 541; the tenth connecting section 543 is located on the other side of the circuit board 200 in the length direction, one end of the tenth connecting section 543 is connected to the first surface 210, and the other end of the tenth connecting section 543 is connected to the other end of the bending section 542. In order to ensure the signal strength of the RF signal, the ninth connecting section 541 is vertically connected to the first surface 210 of the circuit board 200, and the tenth connecting section 543 is vertically connected to the first surface 210 of the circuit board 200, and the tenth connecting section 543 is welded to the pins of the circuit board 200 for radio frequency emission. Further, in order to ensure the signal strength of the radio frequency signal, the plane where the bending section 542 is located is parallel to the first surface 210 of the circuit board 200, thereby increasing the radio frequency signal strength, and improving the monitoring sensitivity of the monitoring device.

Referring to FIG. 3, in some embodiments, the bending section 542 includes a first sub-bending section 544, a second sub-bending section 545, and a third sub-bending section 546, one end of the first sub-bending section 544 is connected to the other end of the ninth connecting section 541; one end of the second sub-bending section 545 is connected to the other end of the first sub-bending section 544; one end of the third sub-bending section 546 is connected to the other end of the second sub-bending section 545, and the other end of the third sub-bending section 546 is connected to the other end of the tenth connecting section 543. In this way, the strength of the radio frequency signal in all directions of the circuit board 200 can be increased, and the difference of signal strength in all directions can be reduced, thereby enhancing the strength and stability of the radio frequency transmission signal, and improving the monitoring sensitivity of the monitoring device.

It should be noted that the length of each connecting section of the first connecting part 510, the second connecting part 520, the third connecting part 530, and the fourth connecting part 540 of the first antenna can be set according to actual conditions. In addition, the connecting sections can be bent and connected at a preset angle according to actual conditions, and each connecting section can be bent into several small sections.

It should be noted that in some embodiments, the monitoring device of the embodiment of the present disclosure may be in the form of a tire pressure sensor in the tire of the vehicle, or may be installed in the tire in other forms, such a monitoring device can realize the monitoring of tire pressure, temperature, acceleration, etc., and with high monitoring sensitivity, thereby improving the driving safety of the vehicle.

The embodiments of the present disclosure are described in detail with reference to the accompanying drawings above, but the present disclosure is not limited to the above embodiments, and various changes may also be made within the knowledge scope of those of ordinary skills in the art without departing from the purpose of the present disclosure. In addition, the embodiments of the present disclosure and the features in the embodiments may be combined with each other without conflict.

What is claimed is:

1. A monitoring device used for acquiring monitoring data of a tire, comprising:
a housing, wherein the housing comprises an upper housing and a lower housing, a cavity is formed between the upper housing and the lower housing;
a circuit board, wherein the circuit board comprises a first surface which is a side of the circuit board close to the upper housing, and the circuit board is installed in the cavity;
a power supply, wherein the power supply is arranged on one side of the circuit board; and
an antenna assembly, wherein the antenna assembly comprises a first antenna, the first antenna is wound on the circuit board for at least three turns, and the first antenna is used for transmitting a radio frequency signal to output the monitoring data;
wherein the first antenna comprises a first connecting part, a second connecting part, a third connecting part and a fourth connecting part, one end of the first connecting part is connected to the first surface, and one end of the second connecting part is connected to the first connecting part, one end of the third connecting part is connected to the other end of the second connecting part, one end of the fourth connecting part is connected to the other end of the third connecting part, and the other end of the fourth connecting part is connected to the first surface, wherein the antenna assembly further comprises:
a second antenna, wherein the second antenna is installed on the first surface, and the second antenna is used for receiving a low frequency signal;
wherein the first connecting part is L-shaped, and the first connecting part comprises:
a first connecting section, wherein the first connecting section is located on one side of the circuit board in a length direction, and one end of the first connecting section is connected to the first surface;
a second connecting section, wherein the second connecting section is located above the first surface, one end of the second connecting section is connected to the first connecting section, and the other end of the second connecting section is connected to the second connecting part;
wherein the second connecting part is U-shaped, and the second connecting part comprises:
a third connecting section, wherein one end of the third connecting section is connected to the second connecting section;
a fourth connecting section, wherein the fourth connecting section is located on the other side of the circuit board in the length direction, the fourth connecting section is close to a side edge of the circuit board, and one end of the fourth connecting section is connected to the other end of the third connecting section;

a fifth connecting section, wherein the fifth connecting section is located below a second surface of the circuit board facing the lower housing, one end of the fifth connecting section is connected to the fourth connecting section, and the other end of the fifth connecting section is connected to the third connecting part;

wherein the third connecting part is Z-shaped, and the third connecting part comprises:

a sixth connecting section, wherein the sixth connecting section is located below the second surface, and one end of the sixth connecting section is connected to the other end of the fifth connecting section;

a seventh connecting section, wherein the seventh connecting section is located below the second surface, one end of the seventh connecting section is connected to the other end of the sixth connecting section;

an eighth connecting section, wherein the eighth connecting section is located below the second surface, one end of the eighth connecting section is connected to the other end of the seventh connecting section, and the other end of the eighth connecting section is connected to the fourth connecting part;

wherein the fourth connecting part is U-shaped, and the fourth connecting part comprises:

a ninth connecting section, wherein the ninth connecting section is located on one side of the circuit board in the length direction, the ninth connecting section is close to the side edge of the circuit board, and one end of the ninth connecting section is connected to the other end of the eighth connecting section;

a bending section, wherein the bending section is located above the first surface, and one end of the bending section is connected to the other end of the ninth connecting section;

a tenth connecting section, wherein the tenth connecting section is located on the other side of the circuit board in the length direction, one end of the tenth connecting section is connected to the first surface, and the other end of the tenth connecting section is connected to the other end of the bending section.

2. The monitoring device of claim 1, wherein the bending section comprises:

a first sub-bending section, wherein one end of the first sub-bending section is connected to the other end of the ninth connecting section;

a second sub-bending section, wherein one end of the second sub-bending section is connected to the other end of the first sub-bending section;

a third sub-bending section, wherein one end of the third sub-bending section is connected to the other end of the second sub-bending section, the other end of the third sub-bending section is connected to the other end of the tenth connecting section.

3. The monitoring device of claim 1, wherein the first antenna has a length of 10.08 cm to 10.18 cm.

4. The monitoring device of claim 2, wherein the first antenna has a length of 10.08 cm to 10.18 cm.

5. The monitoring device of claim 3, wherein a main controller is arranged on the circuit board, and a distance between the main controller and the power supply is 4.5 mm to 5 mm.

6. The monitoring device of claim 5, wherein the lower housing is provided with at least one protrusion, and the protrusion is used for positioning the circuit board.

* * * * *